United States Patent [19]

Rubin

[11] 3,931,076
[45] Jan. 6, 1976

[54] ELIMINATION OF PINKING IN VINYL ASBESTOS FORMULATIONS

[75] Inventor: Gerald Rubin, Edison, N.J.

[73] Assignee: Exxon Research and Engineering Company, Linden, N.J.

[22] Filed: Jan. 9, 1974

[21] Appl. No.: 431,892

[52] U.S. Cl. ... 260/23 XA; 260/23 EP; 260/30.6 R; 260/31.6; 260/31.8 R; 260/31.8 W; 260/42.44; 260/45.8 NT; 260/45.85 R; 260/998.15
[51] Int. Cl.².... C08K 3/34; C08K 5/09; C08K 5/34
[58] Field of Search ..... 260/23 XA, 42.44, 45.85 R, 260/998.15

[56] References Cited
UNITED STATES PATENTS

| | | | |
|---|---|---|---|
| 2,837,490 | 6/1958 | Hecker | 260/23 |
| 3,180,848 | 4/1965 | Thompson | 260/41 |
| 3,287,300 | 11/1966 | Oosterhof et al. | 260/23 |
| 3,288,737 | 11/1966 | Arakawa et al. | 260/27 |
| 3,314,906 | 4/1967 | Bagley et al. | 260/27 |
| 3,541,047 | 11/1970 | Boyer et al. | 260/45.85 |
| 3,730,943 | 5/1973 | Weisfeld et al. | 260/45.75 |

OTHER PUBLICATIONS

Enjay Technical Bulletin No. D–27, Neo Acids, 1963.

*Primary Examiner*—Donald E. Czaja
*Assistant Examiner*—R. A. White
*Attorney, Agent, or Firm*—Frank A. Santoro

[57] ABSTRACT

Improved vinyl asbestos compositions comprising a vinyl chloride resin, plasticizer stabilizer, a hydrocarbon resin, asbestos, fillers, pigments and colorants and heat stabilizers wherein the improvement comprises the inclusion of a stabilizing amount of an anti-pinking additive selected from the group consisting of mono- and dicarboxylic acids having from 5 to 18 carbon atoms. In a preferred embodiment there is described an improved vinyl asbestos tile formula wherein the anti-pinking additive found most effective comprises neodecanoic acid and diethanolamine neodecanoate.

8 Claims, No Drawings

ELIMINATION OF PINKING IN VINYL ASBESTOS FORMULATIONS

FIELD OF THE INVENTION

This invention relates generally to improved vinyl asbestos compositions and more particularly to vinyl asbestos (VA) compositions having improved color. More particularly the invention is directed to the addition of neodecanoic acid and diethanolamine neodecanoate as effective anti-pinking additives in various VA tile formulations.

BACKGROUND OF THE INVENTION

Vinyl asbestos formulations particularly those used in vinyl asbestos tiles are generally composed of polyvinyl chloride or polyvinyl chloride-polyvinyl acetate polymers, a plasticizer, a plasticizer stabilizer, a hydrocarbon resin, asbestos, fillers such as calcium carbonate, pigment and colorants such as titanium dioxide, and lubricants and heat stabilizers. A commonly employed heat stabilizer is melamine. It has been found that when certain types of asbestos are used in combination with the melamine in the formulation, there is produced a pink discoloration in the finished tile. These vinyl asbestos tiles, therefore, are subject to discoloration.

In the prior art, the patentees of U.S. Pat. No. 3,314,906 claim the use of rosin acids to avoid the pink discoloration problem. However, it has been found that the use of these rosin acids unfortunately require high concentrations and are not effective in many cases and hence their use is a disadvantage. U.S. Pat. No. 3,084,135 discloses and claims a vinyl asbestos composition containing a heat stabilizing amount of melamine; it is noted that when such a formulation also employs certain types of asbestos that the finally produced tile has a pink color. The need for effectively eliminating pink discoloration in finished tiles employing the above-described formulation is of importance.

SUMMARY OF THE INVENTION

In accordance with the present invention therefor, improved vinyl asbestos formulations are described containing the conventional vinyl resin, plasticizer, stabilizers, hydrocarbon resin, asbestos, calcium carbonate fillers, titanium dioxide, pigments and colorants, lubricants and heat stabilizers such as melamine wherein the improvement comprises adding an effective amount of mono- and/or dicarboxylic acids as anti-pinking agents. Moreover, the use of the inventive additives as provided herein has an additional advantage over prior art rosin acids in that smaller concentrations are more effective in reducing color and in many instances eliminating color while rosin acids at the same concentration levels are ineffective. In a preferred embodiment, the use of neodecanoic acid and diethanolamine neodecanoate is described to be particularly effective in eliminating pinking in the tested VA tile formulas.

The invention also relates to a process for producing vinyl asbestos formulations with little or no discoloring. The process comprises adding to the initial formulation an effective amount of an anti-pinking additive of the present invention. Additionally, it is also contemplated that the addition of a plasticizer containing the anti-pinking additive may be employed as a practice of the inventive process.

The carboxylic acids that are effective in the present invention may be readily described as ones selected from the group consisting of monocarboxylic acids and dicarboxylic acids and may be either aliphatic or aromatic in character and contain from 2 to 22 carbon atoms, more particularly from 7 to 12 and most preferred from 8 to 10 carbon atoms.

The use of the alkyl ammonium salts of the above acid having from $C_2$ to $C_{22}$, preferably from $C_7$ to $C_{12}$ and most preferably from $C_8$ to $C_{10}$, straight or branched chain ester moieties may also be used. Additionally, metal salts of the above acids are also useful. By metal salt is meant moieties such as calcium or zinc neodecanoate and the like.

One of the preferred species that are useful in the present invention are neoacids. These neoacids are essentially trialkyl acetic acids of the formula:

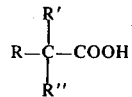

wherein R, R' and R'' are alkyl groups having from $C_1$ to $C_{18}$ carbon atoms, preferably from $C_1$ to $C_9$, most preferably from $C_1$ to $C_6$ carbon atoms.

The vinyl chloride resins used in the compositions of the present invention may be addition polymers produced by polymerization of vinyl chloride alone or in the presence of one or more polymerizable copolymers. Preferably, the vinyl chloride resin will be a straight polyvinyl chloride or a vinyl chloride/vinyl acetate copolymer or a mixture of the two types of resins. The vinyl chloride acetates may contain about 3 to about 20 percent by weight of the vinyl acetate polymerized with vinyl chloride, most preferably about 13 percent by weight vinyl acetate.

The plasticizers suitable for plasticizing vinyl chloride resins may be any of the well known conventional plasticizers such as tricresyl phosphate, dihexyl phthalate, dibutyl phthalate, dioctyl phthalate, diisononyl phthalate, butylbenzyl phthalate, butyloctyl phthalate, dipropylene glycol dibenzoate, epoxidized soybean oil (also heat and light stabilizer) and mixtures thereof.

Vinyl asbestos compositions may also contain fibers, fillers in the form of asbestos. These asbestos additives may be any of the conventional materials such as chrysotile asbestos fiber (hydrous magnesium silicate) etc.

Additionally, vinyl asbestos compositions contain granular inorganic fillers such as calcium carbonate or limestone. The granular inorganic fillers generally are present in the vinyl asbestos compositions in the amount of from 20 to 80 percent of weight based on the weight of the total composition.

Vinyl asbestos compositions also will contain small amounts of pigments such as titanium dioxide or other coloring agents to impart the desired appearance to the tile composition. Additionally, small amounts of materials such as hydrocarbon resins, lubricants, other stabilizers such as zinc, barium and cadmium salts of organic acids may also be incorporated. These pigments, lubricants, coloring agents and other additives will generally be present in an amount of less than about 10 percent of the weight of the total composition.

The melamine heat stabilizers employed in the vinyl asbestos compositions are well known items of commerce. The addition of melamine to the vinyl asbestos tile composition is effective in stabilizing it against heat degradation during manufacturing processes and against degradative effects of heat and light on the tile, when the tile is installed on the floor. As discussed above, however, the addition of melamine often results in an unacceptable pink color appearing in the finished vinyl tile. It is believed that certain types of the asbestos employed, react in some way with the melamine to produce the pink color. Hence to produce a tile free from pink discoloration while at the same time enhancing the effect of the melamine stabilizer it has been found that by the addition of from 0.01 to 10 weight percent (based on total formulation), e.g., the carboxylic acids of the present invention or where the monoester is employed as the additive from 0.01 to 15 weight percent (based on total formulation), such tile production is ultimately accomplished.

As set forth above, the carboxylic acids that might be employed in the present invention may broadly be described as aromatic or aliphatic mono- and dicarboxylic acids having from 5 to 18 carbon atoms. Non-limiting representative examples of carboxylic acids useful in the present invention are acetic acid, ethanedioic acid, dodecanoic acid, dodecanedioic acid, docosanoic acid and docosanedioic acid, 3-bicyclo [2,2,1] heptene-1,6 dicarboxylic acid, cyclohexene dicarboxylic acid, benzoic acid, mesotoic acid, phthalic acids, trimellitic acids and the like including naphthenic acids. The use of the alkyl ammonium and metal salts of the above acids are also contemplated and useful in the present invention. Additionally, ester derivatives of these aforesaid acids in which there is present at least one unreacted carboxyl group which include, for example, monoisononyl phthalate, may also be used.

In forming the vinyl asbestos compositions, all ingredients are thoroughly blended at a temperature generally in the range of 250° to 350°F., mixing may take 45 seconds to 6 minutes in a Banberry mixer and 15 to 45 minutes at the elevated temperature in a Baker-Perkins mixer. After the ingredients have been thoroughly mixed, they are then passed through a mill to form, e.g., a tile blanket. The tile blanket is formed in accordance with methods well known in the art, generally between a cold roll maintained at a temperature of about 140° to 220°F. and a hot roll maintained at a temperature of about 240° to 350°C. The tile is then passed through at least one calendar to finish forming the sheet. The calendar face roll temperature may be maintained at about 110° to 200°F. while the backroll may be relatively cool, below about 160°F. These roll temperatures, however, may vary within the scope of one skilled in the art. After calendering, the blanket is cooled and finally cut into a tile of desired size. After finishing, operations such as coating surface with a wax lacquer or other coating material may then be carried out. The tile is then ready for installation on the floor.

To further illustrate the improved vinyl asbestos compositions of the present invention, the following examples are provided; however, it is to be understood that the details thereof are not to be regarded as limitations, as they may be varied as will be understood by one skilled in the art.

EXAMPLE 1

The following components (see Table I) were blended in the laboratory using a Hobart mixer. The blend was then milled for 5 minutes on an 8" × 16" two roll mill (front roll at 200°F and 42 fpm; backroll at 320°F and 38 fpm) and was sheeted off at a thickness of 0.125".

The additives employed and the amounts used in each of the formulations are listed in Table I together with color of tile produced in each formulation. It is seen from the results in color obtained that less of the invention additive, i.e. monoisononyl phthalate is more effective than the prior art wood rosin in eliminating pinking in tile.

TABLE I

| Ingredient | Amount | Color of Tile |
|---|---|---|
| Vinyl Chloride-Vinyl Acetate Copolymer Resin | 100 | |
| Hydrocarbon resin | 18.4 | |
| Diisononyl phthalate | 43 | |
| Asbestos | 184 | |
| Limestone | 523 | |
| Epoxidized Soybean Oil | 5.7 | |
| Barium Stearate | 1.8 | |
| Zinc Stearate | 0.9 | |
| Melamine | 5.5 | |
| Titanium Dioxide | 8.9 | |
| Additive[1]: | | |
| None | — | Deep Pink |
| 8 wt. % Wood Rosin | — | Sl. Pink (discolored) |
| 6 wt. % Monoisononyl Phthalate | | v. sl. pink (no discoloration) |

[1] Wt. % based on plasticizer concentration

EXAMPLES 2–4

The following components (see Table II) were blended in the identical manner as per Example 1 above.

The additives employed and the amounts used in each of the formulations are listed in Tables III-V together with Color of Tile produced in each formulation.

TABLE II

| Ingredient | Amount |
|---|---|
| PVC/VA[2] | 100 |
| Diisononyl phthalate | 31.6 |
| Asbestos | 167 |
| Limestone | 433 |
| Epoxidized Soybean Oil | 4.7 |
| Barium Stearate | 1.5 |
| Zinc Stearate | 0.8 |
| Melamine | 4.5 |
| Titanium Dioxide | 30.4 |

[2] Vinyl Chloride-Vinyl Acetate Copolymer Resin

TABLE III

| Additive[1] | Color of Tile |
|---|---|
| None | Deep Pink |
| 15 wt. % wood rosin | Sl. Pink (discolored) |
| 12.5 wt. % monoisononyl phthalate | Sl. Pink |
| 5 wt. % neodecanoic acid | No Pinking |
| 10 wt. % calcium neodecanoate (5% Ca) | Slight Pinking |

TABLE IV

| Additive[1] | Color of Tile |
|---|---|
| None | Deep Pink |
| 3 wt. % neodecanoic acid | Very Slight Pink |
| 3 wt. % diethanolamine neodecanoate | No Pinking |

TABLE V

| Additive[1] | Color of Tile |
|---|---|
| None | Deep Pink |
| 5 wt. % neodecanoic acid | No Pinking |
| 6 wt. % isopropyl amine neodecanoate | Very Slight Pink |
| 10 wt. % zinc neodecanoate (8% zinc) | Slight Pink |
| 15 wt. % calcium neodecanoate (6.8% Ca) | Slight Pink |

The above results (Tables III-V inclusive) show the effectiveness of the additives of the present invention in reducing pinking in tile formulations and in some cases eliminating pinking completely.

What is claimed is:

1. A vinyl asbestos composition comprising a vinyl resin, asbestos, fillers, a stabilizing amount of from 0.1% to 2.5% by weight based on the weight of said composition of melamine and an effective amount of from 0.01 to 10% by weight based on the weight of said composition of an anti-pinking additive selected from the group consisting of trialkyl acetic acids having the formula

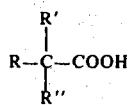

wherein R, R' and R'' are alkyl groups having from 1-18 carbon atoms.

2. The composition according to claim 1 wherein said vinyl resin is a vinyl chloride/vinyl acetate copolymer.

3. The composition according to claim 1 wherein said anti-pinking additive is a trialkyl acetic acid where R, R' and R'' are alkyl groups having from 1 to 6 carbon atoms.

4. The composition according to claim 1 wherein said anti-pinking additive is neodecanoic acid.

5. The composition of claim 4 wherein the amount of neodecanoic acid employed is in the range of from 3 to 5 weight per cent based on the total weight of the composition.

6. The composition of claim 2, wherein from about 3 to about 20% by weight of the vinyl resin is vinyl acetate.

7. The composition according to claim 1 wherein said vinyl resin is polyvinyl chloride.

8. The composition according to claim 1 wherein said vinyl asbestos composition additionally contains plasticizers selected from the group consisting of tricresyl phosphate, dihexyl phthalate, dibutyl phthalate, dioctyl phthalate, diisononyl phthalate, butylbenzyl phthalate, butyloctyl phthalate, dipropylene glycol dibenzoate, epoxidized soybean oil and mixtures thereof.

* * * * *